(12) United States Patent
Watson et al.

(10) Patent No.: US 11,763,188 B2
(45) Date of Patent: Sep. 19, 2023

(54) LAYERED STOCHASTIC ANONYMIZATION OF DATA

(71) Applicant: International Business Machines Corporation, Armonk, NY (US)

(72) Inventors: Patrick Watson, Ossining, NY (US); Maria Chang, Irvington, NY (US); Tengfei Ma, White Plains, NY (US); Aldis Sipolins, New York City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1353 days.

(21) Appl. No.: 15/969,917

(22) Filed: May 3, 2018

(65) Prior Publication Data
US 2019/0340541 A1    Nov. 7, 2019

(51) Int. Cl.
*G06N 20/00* (2019.01)
*G06N 3/08* (2023.01)
(Continued)

(52) U.S. Cl.
CPC ............... *G06N 20/00* (2019.01); *G06N 3/08* (2013.01); *G06T 11/00* (2013.01); *H04L 63/0428* (2013.01); *G06T 2210/41* (2013.01)

(58) Field of Classification Search
CPC ........ G06N 20/00; G06N 3/08; G06N 3/0454; G06N 3/0472; G06N 3/088; G06N 3/084;
(Continued)

(56) References Cited

U.S. PATENT DOCUMENTS

| 8,392,910 B1 | 3/2013 | Asher |
| 8,504,481 B2 | 8/2013 | Motahari et al. |

(Continued)

FOREIGN PATENT DOCUMENTS

| CN | 104798075 A | 7/2015 |
| CN | 106570127 A | 4/2017 |

(Continued)

OTHER PUBLICATIONS

Erdogmus, et al., "Online Entropy Manipulation: Stochastic Information Gradient," IEEE Signal Processing Letters, vol. 10, No. 8, Aug. 2003, 4 pages.
(Continued)

*Primary Examiner* — Khoi V Le
(74) *Attorney, Agent, or Firm* — Amin, Turocy & Watson, LLP

(57) ABSTRACT

Techniques that facilitate layered stochastics anonymization of data are provided. In one example, a system includes a machine learning component and an evaluation component. The machine learning component performs a machine learning process for first data associated with one or more features to generate second data indicative of one or more example datasets within a degree of similarity to the first data. The first data and the second data comprise a corresponding data format. The evaluation component evaluates the second data for a particular feature from the one or more features and generates third data indicative of a confidence score for the second data.

20 Claims, 12 Drawing Sheets

(51) Int. Cl.
  *H04L 9/40* (2022.01)
  *G06T 11/00* (2006.01)
(58) Field of Classification Search
  CPC ..... G06N 7/005; G06T 11/00; G06T 2210/41; H04L 63/0428; H04L 63/0421
  See application file for complete search history.

(56) References Cited

U.S. PATENT DOCUMENTS

| | | | |
|---|---|---|---|
| 9,043,250 B2* | 5/2015 | Ling | G06F 21/6254 703/2 |
| 9,411,672 B1 | 8/2016 | Cooper et al. | |
| 9,519,535 B1 | 12/2016 | Cooper et al. | |
| 9,594,618 B2 | 3/2017 | Cooper et al. | |
| 9,747,150 B2 | 8/2017 | Cooper et al. | |
| 2006/0010430 A1 | 1/2006 | Cousot et al. | |
| 2012/0259788 A1 | 10/2012 | Alles et al. | |
| 2016/0034705 A1 | 2/2016 | Horvitz et al. | |
| 2016/0253498 A1* | 9/2016 | Valencia | G06N 20/00 726/23 |
| 2017/0017536 A1 | 1/2017 | Cooper et al. | |
| 2017/0103344 A1 | 4/2017 | Cooper et al. | |
| 2018/0276560 A1* | 9/2018 | Hu | G06N 20/00 |
| 2019/0130131 A1* | 5/2019 | Huang | G06F 16/285 |
| 2019/0259499 A1* | 8/2019 | Hong | G16H 50/20 |
| 2021/0346091 A1* | 11/2021 | Haslam | B33Y 50/00 |

FOREIGN PATENT DOCUMENTS

| | | |
|---|---|---|
| WO | 2017/175282 A1 | 10/2017 |
| WO | 2018/079020 A1 | 5/2018 |
| WO | 2019/069618 A1 | 4/2019 |

OTHER PUBLICATIONS

Iyengar, "Transforming Data to Satisfy Privacy Constraints," Proceedings of the eighth ACM SIGKDD international conference on Knowledge discovery and data mining, ACM, 2002, 10 pages.

Kelly, et al., "A Survey of State-of-the-Art in Anonymity Metrics," Proceedings of the 1st ACM workshop on Network data anonymization, ACM, 2008, 9 pages.

Podgursky, "Practical K-Anonymity on Large Datasets," Diss., Vanderbilt University, 2011, 64 pages.

International Search Report and Written Opinion received for PCT Application Serial No. PCT/IB2019/053375 dated Jul. 3, 2019, 9 pages.

Notice of Reasons for Refusal received for Japanese Patent Application Serial No. 2020-555842 dated Oct. 18, 2022, 8 pages (Including English Translation).

Office Action received for United Kingdom Patent Application Serial No. 2017391.0 dated Apr. 1, 2022, 6 pages.

* cited by examiner

LAYERED STOCHASTIC ANONYMIZATION OF DATA

BACKGROUND

The subject disclosure relates to machine learning, and more specifically, to anonymizing data associated with a machine learning network.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate layered stochastic anonymization of data are described.

According to an embodiment, a system can comprise a machine learning component and an evaluation component. The machine learning component can perform a machine learning process for first data associated with one or more features to generate second data indicative of one or more example datasets within a degree of similarity to the first data. The first data and the second data can comprise a corresponding data format. The evaluation component can evaluate the second data for a particular feature from the one or more features and generates third data indicative of a confidence score for the second data.

According to another embodiment, a computer-implemented method is provided. The computer-implemented method can comprise receiving, by a system operatively coupled to a processor, first data associated with one or more features via an encrypted communication channel. The computer-implemented method can also comprise performing, by the system, a first machine learning process associated with a generative model for the first data to generate second data indicative of one or more example datasets within a degree of similarity to the first data. Furthermore, the computer-implemented method can comprise performing, by the system, a second machine learning process associated with a classifier model for the second data to generate third data indicative of a confidence score for the second data.

According to yet another embodiment, a computer program product for facilitating anonymization of data can comprise a computer readable storage medium having program instructions embodied therewith. The program instructions can be executable by a processor and cause the processor to perform, by the processor, a machine learning process for first data associated with one or more features to generate second data indicative of one or more example datasets within a degree of similarity to the first data. The program instructions can also cause the processor to evaluate, by the processor, the second data for a particular feature from the one or more features. Furthermore, the program instructions can cause the processor to generate, by the processor, third data indicative of a confidence score for the second data.

DETAILED DESCRIPTION

Figure 1:
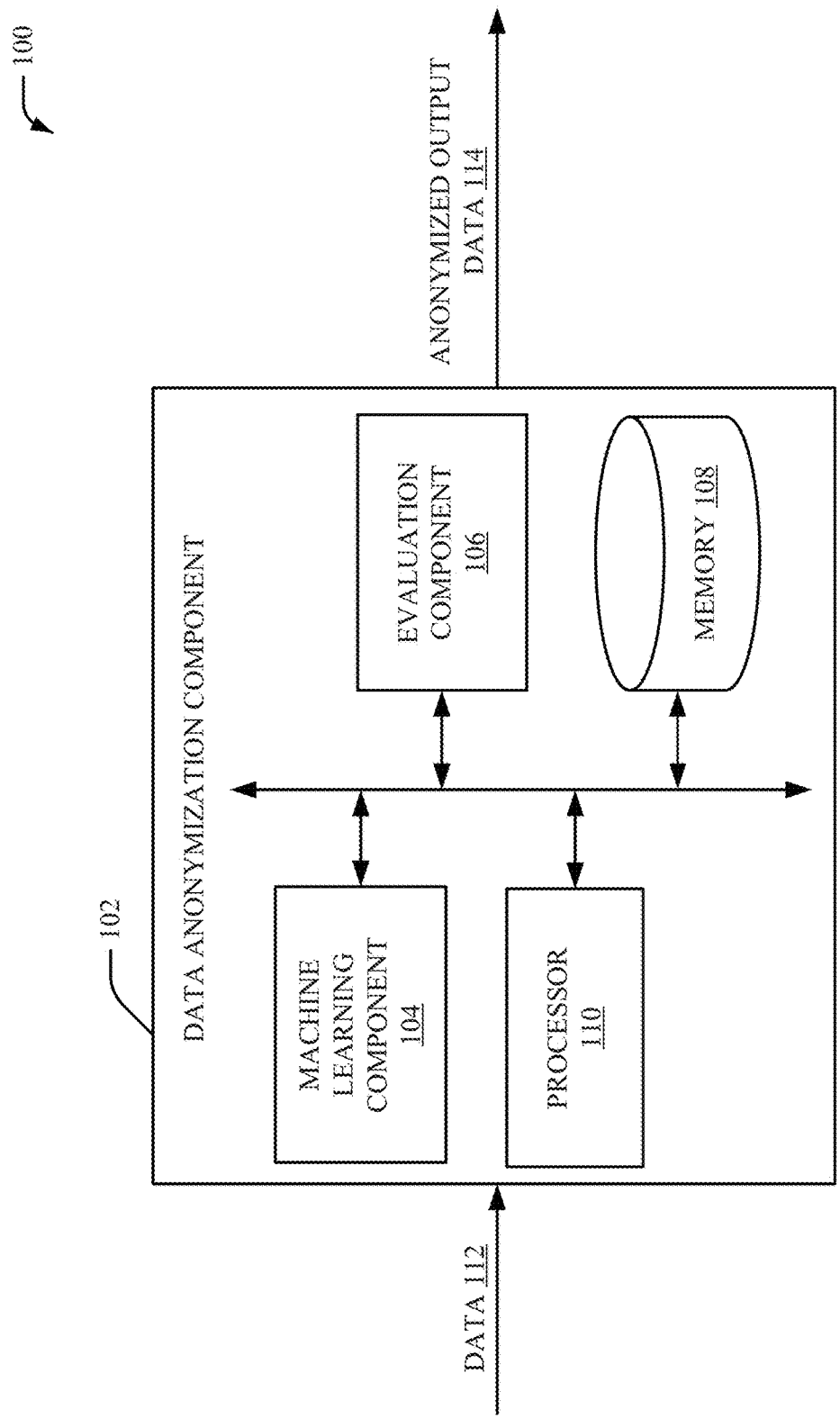
FIG. 1 illustrates a block diagram of an example, non-limiting system that includes a data anonymization component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Often times digital data is associated with a computing device and/or a user identity. For example, a medical image can be associated with a patient and/or a medical device that generates the medical image, speech data can be associated with a user and/or a computing device that generates the speech data, etc. Furthermore, digital data is often analyzed for various technological purposes. However, it is generally difficult to analyze digital data without de-anonymization of the digital data.

Embodiments described herein include systems, computer-implemented methods, and computer program products that facilitate anonymization of data. For example, layered stochastic anonymization of data can be employed to provide improved security, and/or quality of digital data. In an aspect, a generative model of data (e.g., a generative model of digital data) can be employed to facilitate anonymization of the data. The generative model can be searched based on identifying data that can be provided as input to the generative model. The identifying data can be data associated with a user identity. Furthermore, output generated by the generative model can be provided rather than an original version of data. In an embodiment, a user can submit data associated with a user identity via an encrypted communication channel. Based on the data associated with the user identity, a generative model can be generated. The generative model can be trained to produce examples of a type specified by the data associated with the user identity. Additionally, a set of statistical constraints can be applied to the generative model to produce a set of examples along a gradient of similarity to the data associated with the user identity. Furthermore, the set of examples can be evaluated for presence or likelihood of a particular feature. A confidence estimate for quality of the evaluation (e.g., the evaluation of the presence or the likelihood of the particular feature) can also be determined. In certain embodiments, a negotiation process between the user and a scoring protocol associated with the confidence estimate can be provided to allow the user to release an increased amount of identifying information associated with the data in response to observing the confidence estimate. As such, anonymization of data can be improved. For instance, data can be anonymized while also providing, for example, analysis of anonymized data. Security, and/or quality of data can therefore also be provided. Moreover, accuracy of data generated by a machine learning process can be improved, quality of data generated by a machine learning process can be improved, speed of data generated by a machine learning process can be improved, and/or a cost for analyzing data using a machine learning process can be reduced. Accuracy and/or efficiency of a machine learning model generated by a machine learning process can also be provided.

FIG. 1 illustrates a block diagram of an example, non-limiting system 100 that facilitates anonymization of data in accordance with one or more embodiments described herein. For instance, the system 100 can facilitate layered stochastic anonymization of data. In various embodiments, the system 100 can be a machine learning system associated with technologies such as, but not limited to, machine learning technologies, artificial intelligence technologies, batch learning technologies, computer technologies, server technologies, information technologies, digital technologies, data analysis technologies, data classification technologies, data clustering technologies, medical imaging technologies, medical device technologies, filtering technologies, recommendation system technologies, signal processing technologies, image processing technologies, video processing technologies, audio processing technologies, and/or other digital technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a data anonymization component, etc.) for carrying out defined tasks related to data anonymization and/or machine learning. The system 100 and/or components of the system can be employed to solve new problems that arise through advancements in technologies mentioned above, employment of machine learning, and/or computer architecture, and the like. One or more embodiments of the system 100 can provide technical improvements to machine learning systems, artificial intelligence systems, batch learning systems, computer systems, server systems, information systems, digital systems, data analysis systems, data classification systems, data clustering systems, medical imaging systems, medical device systems, filtering systems, recommendation systems, signal processing systems, image processing systems, video processing systems, audio processing systems, and/or other systems. One or more embodiments of the system 100 can also provide technical improvements to a processing unit (e.g., a processor) associated with a machine learning process by improving processing performance of the processing unit, improving processing efficiency of the processing unit, and/or reducing an amount of time for the processing unit to perform a machine learning process.

In the embodiment shown in FIG. 1, the system 100 can include a data anonymization component 102. As shown in FIG. 1, the data anonymization component 102 can include a machine learning component 104 and an evaluation component 106. Aspects of the data anonymization component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the data anonymization component 102 can also include memory 108 that stores computer executable components and instructions. Furthermore, the data anonymization component 102 can include a processor 110 to facilitate execution of the instructions (e.g., computer executable components and corresponding instructions) by the data anonymization component 102. As shown, the machine learning component 104, the evaluation component 106, the memory 108 and/or the processor 110 can be electrically and/or communicatively coupled to one another in one or more embodiments.

The data anonymization component 102 (e.g., the machine learning component 104 of the data anonymization component 102) can receive data 112. The data 112 can be generated by one or devices. Additionally or alternatively, the data 112 can be stored in one or more databases that receives and/or stores the data 112 associated with the one or devices. In an aspect, the data 112 can be digital data. Furthermore, the data 112 can include one or more types of data, such as but not limited to, medical imaging data, audio data, image data, video data, textual data and/or other data. The data 112 can also be encoded data, processed data and/or raw data. In an aspect, the data 112 can be associated with one or more features and/or one or more characteristics. Furthermore, the data 112 can be associated with a user identity. For instance, the data 112 can be identifying data that can identify one or more features and/or one or more characteristics of a user. In a non-limiting embodiment, data 112 can be two-dimensional medical data and/or three-dimensional medical data generated by one or more medical devices. In one example, the data 112 can be electromagnetic radiation imagery captured via a set of sensors (e.g., a set of sensors associated with a medical device). In certain embodiments, the data 112 can be a series of electromagnetic radiation imagery captured via a set of sensors (e.g., a set of sensors associated with a medical device) during an interval of time. A medical device can be, for example, an x-ray device, a medical resonance imaging device, a computed tomography (CT) device, another type of medical device, etc. In one example, the data 112 can be associated with a patient.

The machine learning component 104 can perform a machine learning process for the data 112. The machine learning process associated with the machine learning component 104 can be a machine learning process associated with unsupervised learning. Furthermore, the machine learning process associated with the machine learning component 104 can be a generative model. For instance, the machine learning process associated with the machine learning component 104 can determine a distribution or pattern of the data 112. Furthermore, the machine learning component 104 can generate machine learning output data that includes one or more example datasets within a degree of similarity to the data 112. The machine learning output data can include one or more types of data, such as but not limited to, medical imaging data, audio data, image data, video data, textual data and/or other data. In an aspect, the data 112 and the machine learning output data can comprise a corresponding data format. For example, the data 112 can be medical imaging data and the machine learning output data can be an example dataset of medical imaging data. In an embodiment, the machine learning process associated with the machine learning component 104 can employ a variational autoencoder. For instance, the variational autoencoder can employ a probability distribution associated with the data 112 to generate the machine learning output data that includes the one or more example datasets within the degree of similarity to the data 112. Additionally or alternatively, the machine learning component 104 can employ Hidden Markov Models (HMMs), Bayesian models (e.g., Bayesian networks), probabilistic context-free grammar models, Naïve Bayes models, Gaussian mixture models, and/or another type of generative machine learning process to generate the machine learning output data that includes the one or more example datasets within the degree of similarity to the data 112. As such, the machine learning component 104 can perform a machine learning process for first data associated with one or more features to generate second data indicative of one or more example datasets within a degree of similarity to the first data. The first data and the second data can, for example, comprise a corresponding data format. Furthermore, the machine learning component 104 can employ a generative model associated with the first data during the machine learning process to generate the second data. Additionally or alternatively, in certain embodiments, the machine learning component 104 can employ a variational autoencoder associated with the first data during the machine learning process to generate the second data.

The evaluation component 106 can evaluate the machine learning output data for a particular feature from the one or more features. The evaluation component 106 can employ principles of artificial intelligence to facilitate evaluation of the machine learning output data for a particular feature from the one or more features. The evaluation component 106 can perform learning with respect to the machine learning output data explicitly or implicitly. In an aspect, the evaluation component 106 can evaluate the machine learning output data for a particular feature from the one or more features based on classifications, correlations, inferences and/or expressions associated with principles of artificial intelligence. For instance, the evaluation component 106 can employ an automatic classification system and/or an automatic classification process to evaluate of the machine learning output data for a particular feature from the one or more features. Furthermore, the evaluation component 106 can generate anonymized output data 114. The anonymized output data 114 can be indicative of a confidence score for the machine learning output data. In an embodiment, the evaluation component 106 can evaluate the machine learning output data based on a deep learning network. The deep learning network can be an artificial neural network that employs deep learning to determine at least one feature associated with the machine learning output data. The deep learning network can, for example, employ supervised learning to determine at least one feature associated with the machine learning output data. Furthermore, the deep learning network can process information similar to a biological neuron system that employs a cascade of multiple layers of nonlinear processing where a first layer can employ output of a second layer as input for the first layer.

In a non-limiting embodiment, the evaluation component 106 can evaluate the machine learning output data based on a convolutional neural network. The convolutional neural network can be a feed-forward artificial neural network that employs deep learning to determine at least one feature associated with the machine learning output data. Furthermore, the convolutional neural network can be a classifier associated with supervised learning to determine at least one feature associated with the machine learning output data. For instance, the convolutional neural network can include a set of convolutional layers that apply one or more convolutional operations to the machine learning output data. The convolutional neural network can also include a set of fully connected layers that compute a classification score associated with the machine learning output data. Additionally, in certain embodiments, the convolutional neural network can also include a set of pooling layers that perform downsampling to adjust a spatial dimension associated with the machine learning output data. However, it is to be appreciated that in certain embodiments the evaluation component 106 can employ another type of deep learning network. In an embodiment, the evaluation component 106 can generate scoring data indicative of a confidence score for the associated with the machine learning output data. For instance, the evaluation component 106 can generate scoring data indicative of a confidence score indicative of a degree of confidence that the particular feature is included in the data 112. The scoring data can be, for example, third data. In certain embodiments, the anonymized output data 114 can include the score data. In another embodiment, the evaluation component 106 can employ other data associated with the data 112 for an additional layer of the deep learning network associated with the machine learning process in response to a determination that the scoring data satisfies a defined criterion. For example, the evaluation component 106 can employ other data associated with the data 112 in response to a determination that the scoring data satisfies a defined criterion. Furthermore, the evaluation component 106 can employ an additional layer of the convolutional neural network associated with the machine learning process in response to the determination that the scoring data satisfies the defined criterion. The other data associated with the data 112 can be, for example, additional data associated with an increased amount of identifying data for the user identity associated with the data 112. In certain embodiments, user data associated with a user can initiate employment of the other data associated with the data 112 for the additional layer of the deep learning network.

It is to be appreciated that the data anonymization component 102 (e.g., the machine learning component 104 and/or the evaluation component 106) performs a data anonymization process that cannot be performed by a human (e.g., is greater than the capability of a single human mind). For example, an amount data processed, a speed of processing of data and/or data types processed by the data anonymization component 102 (e.g., the machine learning component 104 and/or the evaluation component 106) over a certain period of time can be greater, faster and different than an amount, speed and data type that can be processed by a single human mind over the same period of time. The data anonymization component 102 (e.g., the machine learning component 104 and/or the evaluation component 106) can also be fully operational towards performing one or more other functions (e.g., fully powered on, fully executed, etc.) while also performing the above-referenced data anonymization process. Moreover, the anonymized output data 114 generated by the data anonymization component 102 (e.g., the machine learning component 104 and/or the evaluation component 106) can include information that is impossible to obtain manually by a user.

Figure 2:
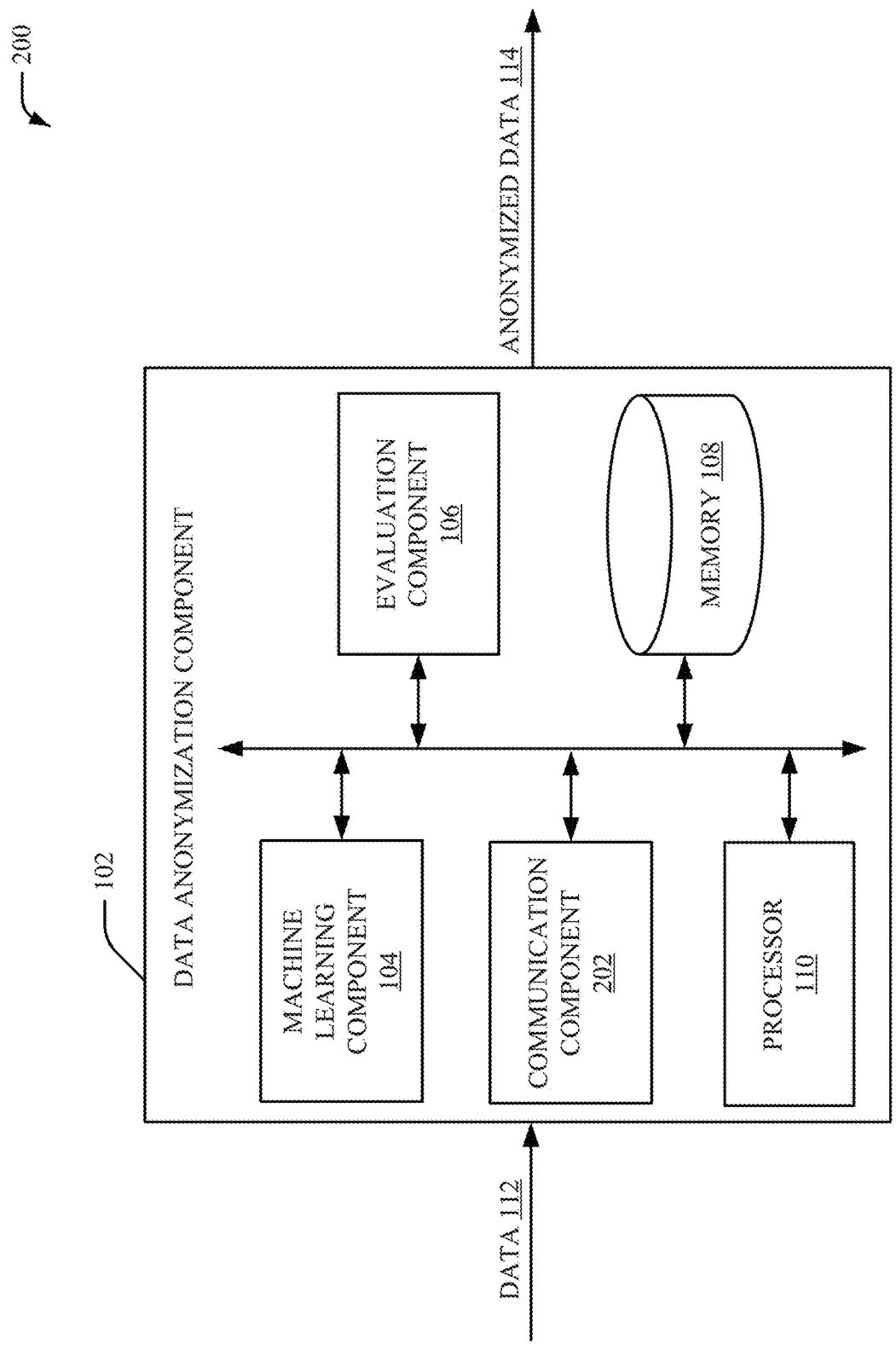
FIG. 2 illustrates a block diagram of another example, non-limiting system that includes a data anonymization component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the data anonymization component 102. The data anonymization component 102 can include the machine learning component 104, the evaluation component 106, and/or a communication component 202. The communication component 202 can receive the data 112. Additionally or alternatively, the communication component 202 can transmit the anonymized output data 114. In an aspect, the communication component 202 can receive the data 112 via an encrypted communication channel. In an embodiment, the encrypted communication channel can be a wired encrypted communication channel. In another embodiment, the encrypted communication channel can be a wireless communication channel. For instance, the encrypted communication channel include one or more wireless encrypted communication channels and/or one or more wired encrypted communication channels, including but not limited to, a wide area network (WAN, e.g., the Internet) encrypted communication channel, a local area network (LAN) encrypted communication channel, a cellular encrypted communication channel, and/or another type of encrypted radio channel. In certain embodiments, the encrypted communication channel can be associated with one or more network devices (e.g., network hardware, network equipment, computer networking devices, etc.) to facilitate communication via the encrypted communication channel.

Figure 3:
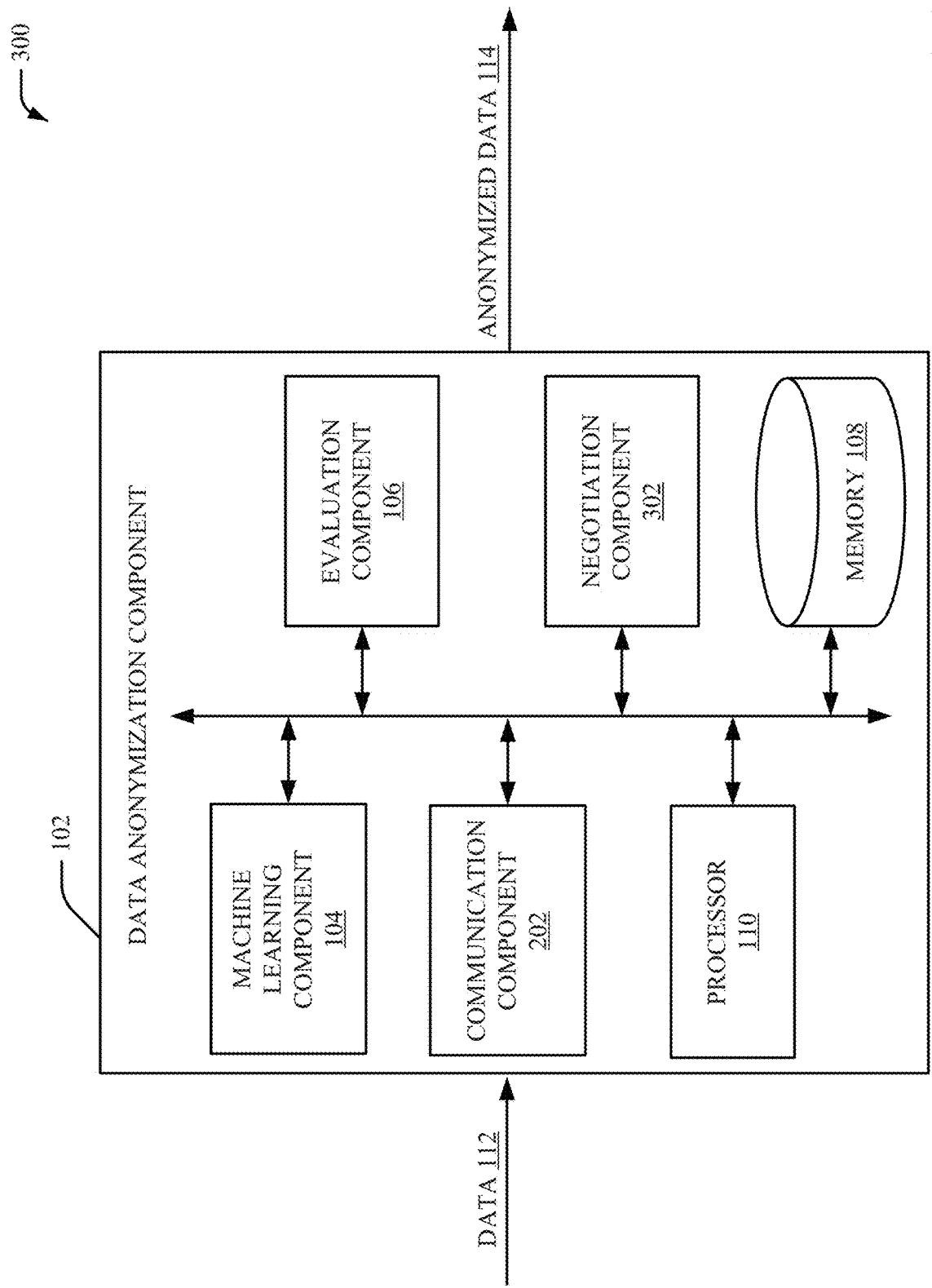
FIG. 3 illustrates a block diagram of yet another example, non-limiting system that includes a data anonymization in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the data anonymization component 102. The data anonymization component 102 can include the machine learning component 104, the evaluation component 106, the communication component 202, and/or a negotiation component 302. The negotiation component 302 can facilitate a negotiation process between a user device and the data anonymization component 102. For instance, the negotiation component 302 can facilitate a negotiation process between a user and a scoring protocol associated with the evaluation component 106. The user device can be an electronic device such as, for example, a computing device, a controller, a computer, a desktop computer, a laptop computer, a monitor device, a smart device, a smart phone, a mobile device, a handheld device, a tablet, a wearable device, a portable computing device or another type of device. The negotiation process can facilitate allowing an increased amount of identifying data for the data 112 associated with the user identity. For example, the user device can display information associated with the anonymized output data 114 in a human interpretable format. In an aspect, the negotiation component 302 can provide a diagnosis associated with the data 112 to the user device. Additionally, the negotiation component 302 can provide a confidence score for the diagnosis associated with the data 112 to the user device. The user device can provide user data to the data anonymization component 102 to request a higher fidelity response associated with the data 112. For example, user device can provide user data to the data anonymization component 102 to allow an increased amount of identifying data for the data 112 associated with the user identity.

Figure 4:
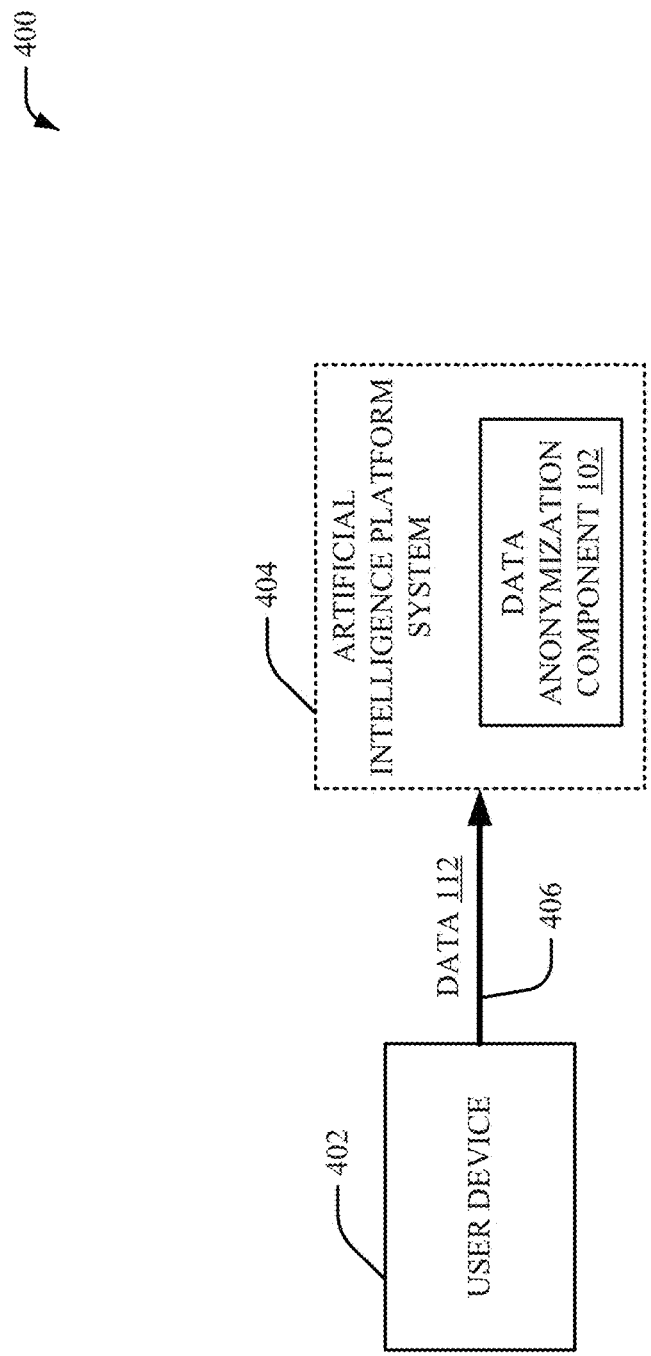
FIG. 4 illustrates an example, non-limiting system that includes a user device and an artificial intelligence platform system in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes a user device 402 and an artificial intelligence platform system 404. The user device 402 can be an electronic device such as, for example, a computing device, a controller, a computer, a desktop computer, a laptop computer, a monitor device, a smart device, a smart phone, a mobile device, a handheld device, a tablet, a wearable device, a portable computing device or another type of device. In certain embodiments, the user device 402 can be a medical device such as, for example, an x-ray device, a medical resonance imaging device, a CT device, or another type of medical device. The artificial intelligence platform system 404 can include the data anonymization component 102. In one example, the artificial intelligence platform system 404 can be a server system to facilitate execution of one or more machine learning algorithms, execution of one or more application programming interfaces associated with machine learning, etc. In an embodiment, the user device 402 can provide the data 112 to the data anonymization component 102 associated with the artificial intelligence platform system 404 via an encrypted communication channel 406. In an embodiment, the encrypted communication channel 406 can be a wired encrypted communication channel. In another embodiment, the encrypted communication channel 406 can be a wireless communication channel. For instance, the encrypted communication channel 406 can include one or more wireless encrypted communication channels and/or one or more wired encrypted communication channels, including but not limited to, a wide area network (WAN, e.g., the Internet) encrypted communication channel, a local area network (LAN) encrypted communication channel, a cellular encrypted communication channel, and/or another type of encrypted radio channel. In certain embodiments, the encrypted communication channel 406 can be associated with one or more network devices (e.g., network hardware, network equipment, computer networking devices, etc.) to facilitate communication of the data 112 via the encrypted communication channel 406.

Figure 5:
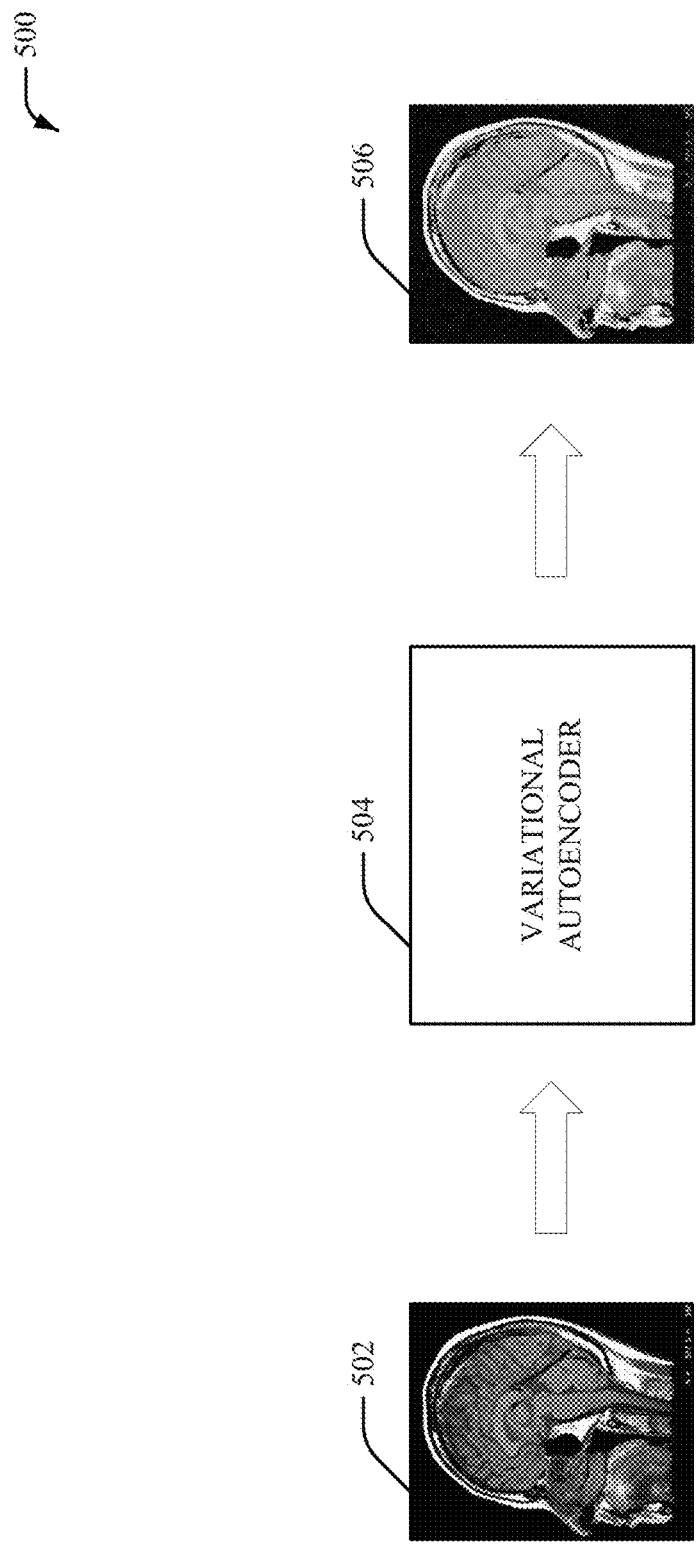
FIG. 5 illustrates an example, non-limiting system that includes a variational autoencoder in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes data 502. The data 502 can be medical imaging data, audio data, image data, video data, textual data and/or other data. The data 502 can also be encoded data, processed data and/or raw data. In an embodiment, the data 502 can correspond to the data 112 received by the data anonymization component 102. The data 502 can also be associated with one or more features and/or one or more characteristics. Furthermore, the data 502 can be associated with a user identity. For instance, the data 502 can be identifying data that can identify one or more features and/or one or more characteristics of a user. In a non-limiting embodiment, the data 502 can be medical imagery data associated with a patient (e.g., a patient identity). A variational autoencoder 504 can receive the data 502 as input. The variational autoencoder 504 can employ a probability distribution associated with the data 502 to generate machine learning output data 506. Furthermore, the variational autoencoder 504 can be a layered variational autoencoder that employs unsupervised learning associated with a probability distribution for the data 502. In an aspect, the variational autoencoder 504 can employ a neural network and stochastic gradient descent associated with the data 502. In another aspect, the variational autoencoder 504 can include an encoder and a decoder to generate the machine learning output data 506 from the data 502. The machine learning output data 506 can be, for example, a compressed version of the data 502 that includes a lesser degree of identifying data than the data 502. For example, the machine learning output data 506 can include a lower number of features and/or characteristics than the data 502. Additionally or alternatively, the machine learning output data 506 can modify one or more portions of the data 502 while maintaining one or more features and/or one or more characteristics of the data 502. The machine learning output data 506 can be medical imaging data, audio data, image data, video data, textual data and/or other data. In a non-limiting embodiment, the machine learning output data 506 can be medical imagery data associated with a lesser degree of identifying data for the patient (e.g., the patient identity) associated with the data 502. In an aspect, the data 502 and the machine learning output data 506 can comprise a corresponding data format. For example, the data 502 can be medical imaging data and the machine learning output data 506 can be an example dataset of medical imaging data within a degree of similarity to the data 502. It is to be appreciated that, in an alternate embodiment, a Hidden Markov Model (HMM), a Bayesian model (e.g., Bayesian network), a probabilistic context-free grammar model, a Naïve Bayes model, a Gaussian mixture model, and/or another type of generative machine learning process can be employed rather than the variational autoencoder 504 to generate the machine learning output data 506.

Figure 6:
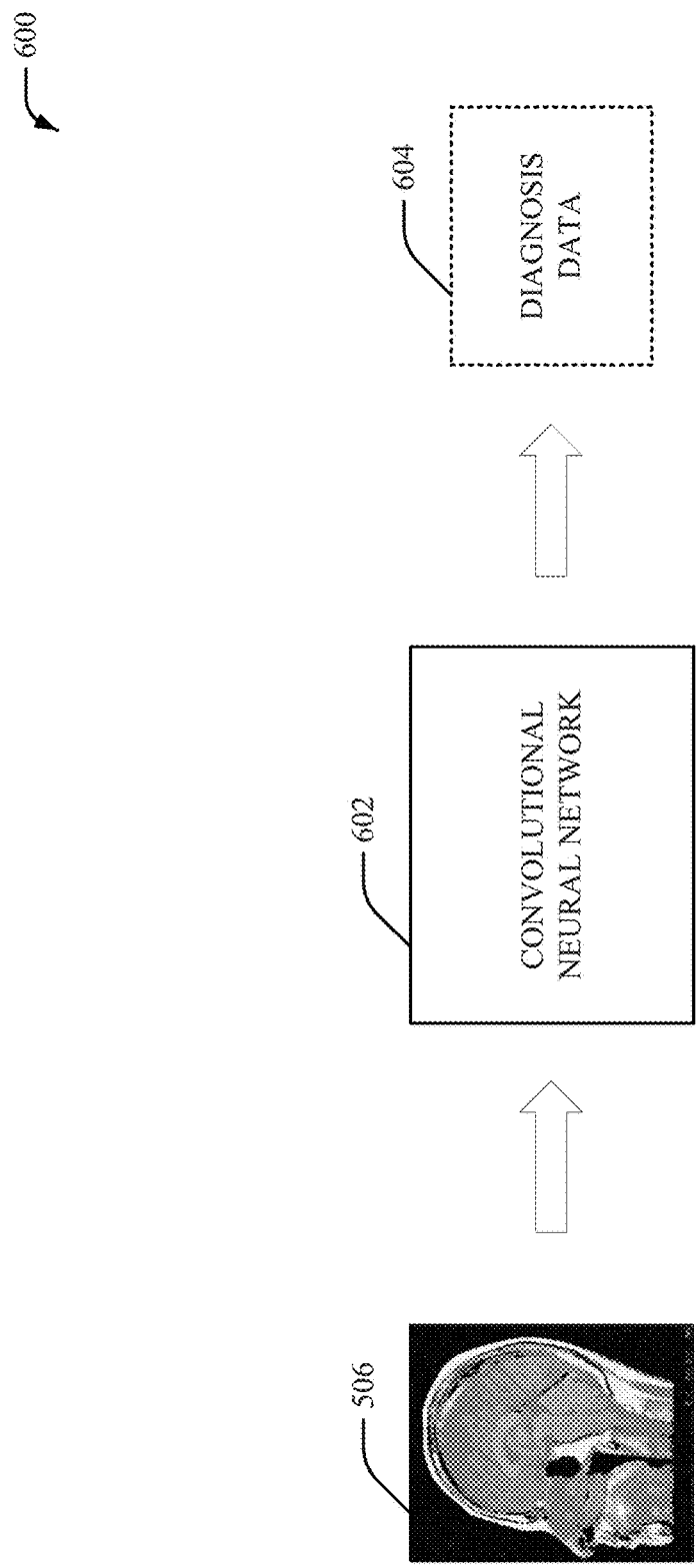
FIG. 6 illustrates an example, non-limiting system that includes a convolutional neural network in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the machine learning output data 506. The machine learning output data 506 can be provided as input to a convolutional neural network 602. The convolutional neural network 602 can be a feed-forward artificial neural network that employs deep learning to determine at least one feature associated with the machine learning output data 506. Furthermore, the convolutional neural network 602 can be a classifier associated with supervised learning to determine at least one feature associated with the machine learning output data 506. For instance, the convolutional neural network 602 can include a set of convolutional layers that apply one or more convolutional operations to the machine learning output data 506. The convolutional neural network 602 can also include a set of fully connected layers that compute a classification score associated with the machine learning output data 506. Additionally, in certain embodiments, the convolutional neural network 602 can also include a set of pooling layers that perform downsampling to adjust a spatial dimension associated with the machine learning output data 506. However, it is to be appreciated that in certain embodiments another type of deep learning network can be employed rather than the convolutional neural network 602. The convolutional neural network 602 can generate diagnosis data 604 based on a convolutional neural network process associated with the machine learning output data 506. The diagnosis data 604 can include a classification and/or a confidence score for a particular feature and/or a particular characteristic being included in the data 502. For example, diagnosis data 604 can include a classification and/or a confidence score indicative of a degree of confidence that the particular feature is included in the data 112. In a non-limiting embodiment, the diagnosis data 604 can include a classification and/or a confidence score for a medical abnormality being included in the data 502. For example, the diagnosis data 604 can include an indication and/or a confidence score as to whether a particular medical abnormality is included in the data 502.

Figure 7:
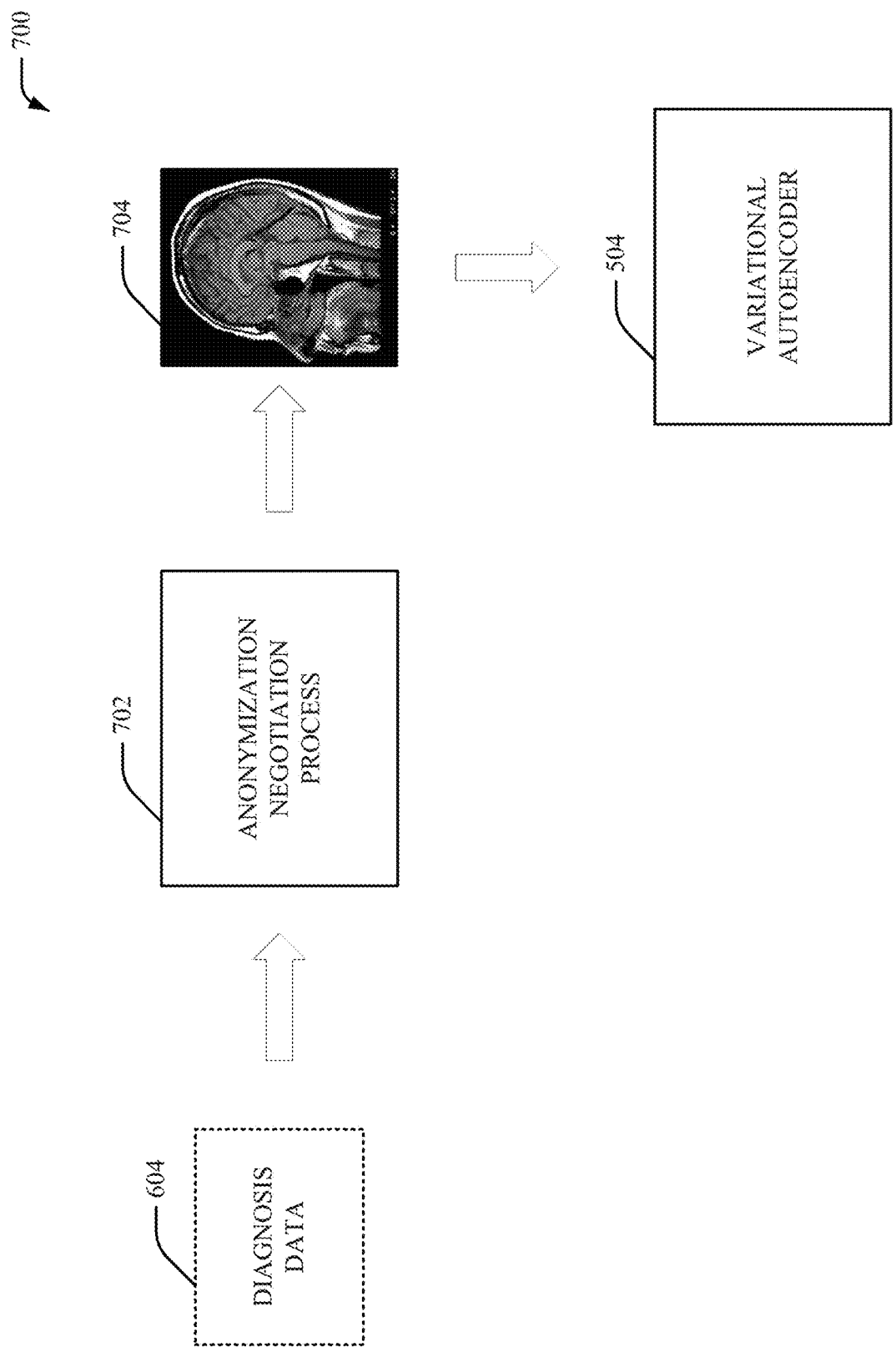
FIG. 7 illustrates an example, non-limiting system that includes an anonymization negation process and a variational autoencoder in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes an anonymization negotiation process 702. The anonymization negotiation process 702 can be performed based on the diagnosis data 604. Furthermore, the anonymization negotiation process 702 can facilitate a negotiation process between a user and an artificial intelligence platform system associated with the data 502. The user device can be an electronic device such as, for example, a computing device, a controller, a computer, a desktop computer, a laptop computer, a monitor device, a smart device, a smart phone, a mobile device, a handheld device, a tablet, a wearable device, a portable computing device or another type of device. The anonymization negotiation process 702 can facilitate allowing an increased amount of identifying data for the data 502 associated with a user identity. For example, the user device can display information associated with the diagnosis data 604 in a human interpretable format. In an embodiment, the anonymization negotiation process 702 can provide the diagnosis data 604 to the user device. The user device can provide user data during the anonymization negotiation process 702 to request a higher fidelity response associated with the data 502. For example, user device can provide user data during the anonymization negotiation process 702 to allow an increased amount of identifying data for the data 502 associated with the user identity. As such, in response to a determination that a higher fidelity response associated with the data 502 is requested, modified data 704 is provided to the variational autoencoder 504. The modified data 704 can be a modified version of the data 502. Furthermore, the modified data 704 can include one or more additional features and/or one or more additional characteristics that are not included in the data 502. For instance, the modified data 704 can provide additional information to allow an increased amount of identifying data for a user identity associated with the data 502.

Figure 8:
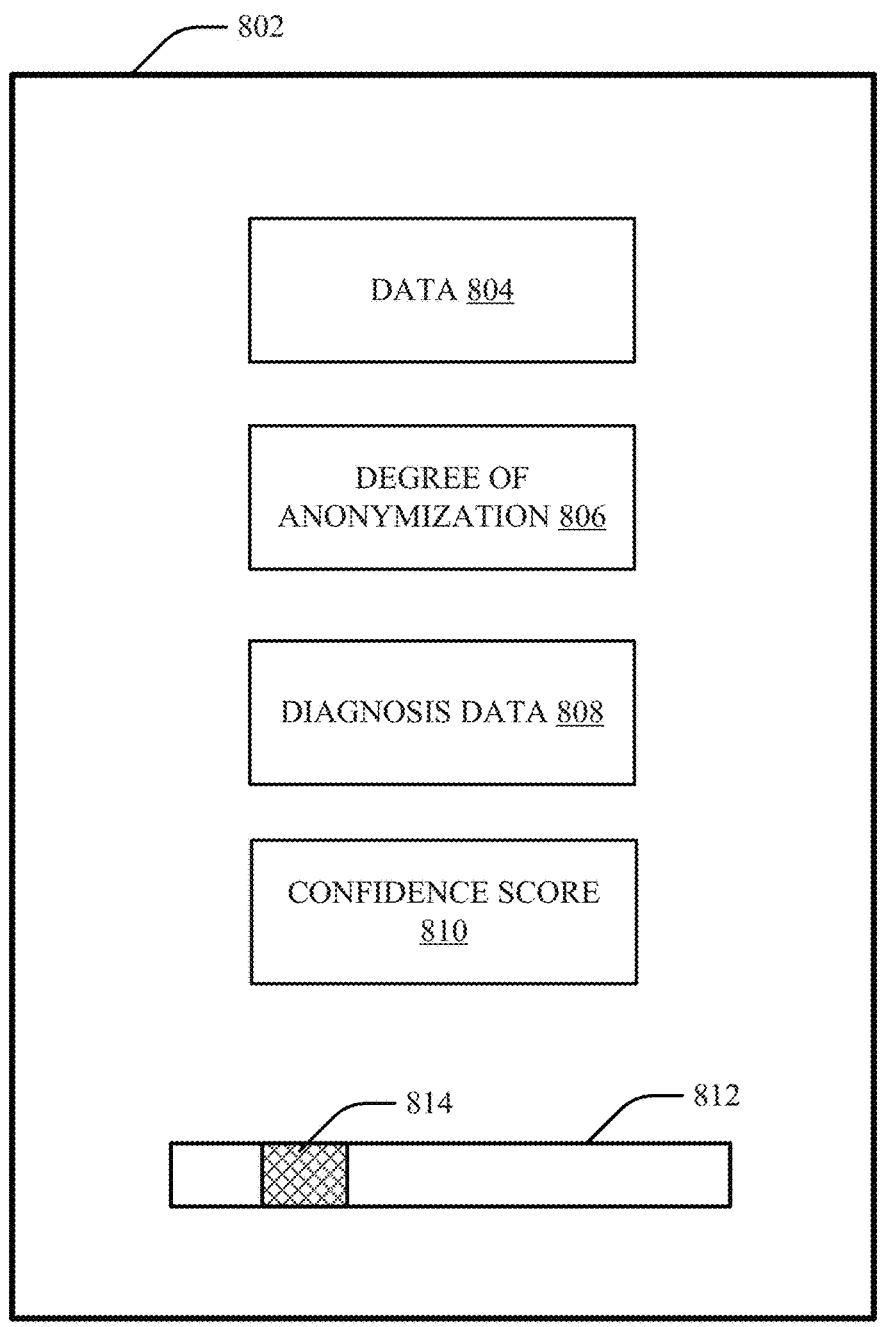
FIG. 8 illustrates an example, non-limiting user interface associated with data anonymization in accordance with one or more embodiments described herein.

FIG. 8 illustrates a block diagram of an example, non-limiting system 800 in accordance with one or more embodiments described herein. Repetitive description of like elements employed in other embodiments described herein is omitted for sake of brevity.

The system 800 illustrates an example user interface 802. In one embodiment, the user interface 802 can be associated with a user interface generated by the data anonymization component 102 (e.g., the negotiation component 302 of the data anonymization component 102). The user interface 802 can be a user interface (e.g., a graphical user interface) presented on a display of a user device such as, but not limited to, a computing device, a computer, a desktop computer, a laptop computer, a monitor device, a smart device, a smart phone, a mobile device, a handheld device, a tablet, a portable computing device or another type of user device associated with a display. In certain embodiments, the user interface 802 can be associated with an artificial intelligence platform system. For example, the user interface 802 can be associated with an application programming interface executed by an artificial intelligence platform system. The user interface 802 can display and/or provide data 804. In an embodiment, the data 804 can be data provided to the data anonymization component 102. For example, the data 804 can correspond to the data 112 and/or the data 502. In an embodiment, the data 804 can be data generated by the data anonymization component 102. For example, the data 804 can correspond to the machine learning output data 506. The data 804 can be medical imaging data, audio data, image data, video data, textual data and/or other data. The user interface 802 can also display a degree of anonymization 806. The degree of anonymization 806 can be a degree of anonymization associated with the data 804. For example, the degree of anonymization 806 can indicate an amount identifying data for a user identity associated with the data 804. Additionally or alternatively, the user interface 802 can include diagnosis data 808. The diagnosis data 808 can include a classification for a particular feature and/or a particular characteristic being included in the data 804. In a non-limiting embodiment, the diagnosis data 808 can include a classification of a medical abnormality identified in the data 804. Additionally or alternatively, the user interface 802 can include a confidence score 810. The confidence score 810 can be a confidence score for a particular feature and/or a particular characteristic being included in the data 804. For example, the confidence score 810 can include a confidence score indicative of a degree of confidence that the particular feature is included in the data 804. In a non-limiting embodiment, the confidence score 810 can include a confidence score for a medical abnormality being included in the data 804. For example, the confidence score 810 can include a confidence score as to whether a particular medical abnormality is included in the data 804. The user interface 802 can also include a toolbar 812. The toolbar 812 can include a slider button 814 that allows a user to control the degree of anonymization 806 for the data 804. For example, a location of the slider button 814 of the toolbar 812 can be modified to control an amount of identifying data associated with the data 804. It is to be appreciated that the user interface 802 is merely an example. Therefore, the location of sections associated with the user interface 802 and/or content of the user interface 802 can be varied. Furthermore, the user interface 802 can include other features, content and/or functionalities not shown in FIG. 8.

Figure 9:
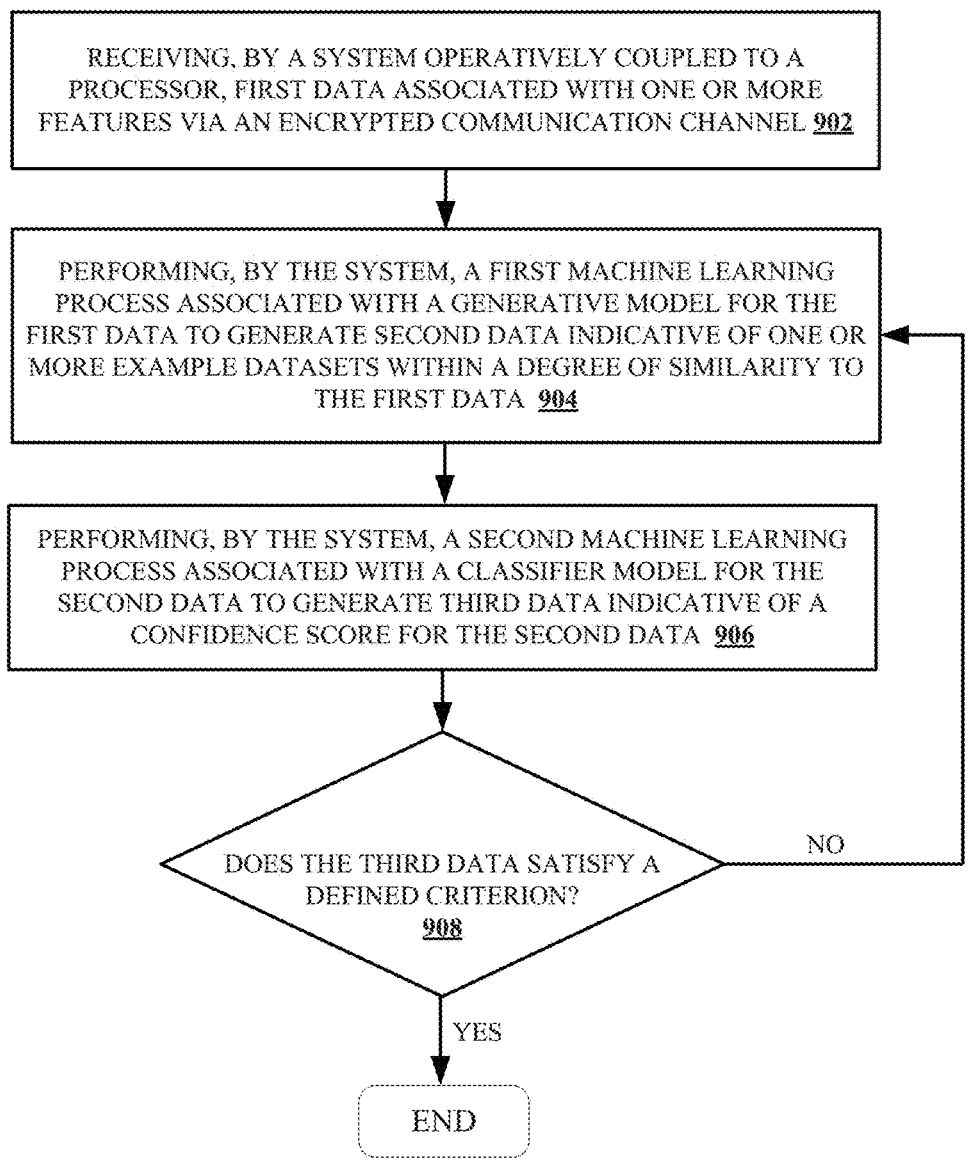
FIG. 9 illustrates a flow diagram of an example, non-limiting computer-implemented method for facilitating data anonymization in accordance with one or more embodiments described herein.

FIG. 9 illustrates a flow diagram of an example, non-limiting computer-implemented method 900 that facilitates data anonymization in accordance with one or more embodiments described herein. At 902, first data associated with one or more features is received, by a system operatively coupled to a processor (e.g., by machine learning component 104), via an encrypted communication channel. The first data can be medical imaging data, audio data, image data, video data, textual data and/or other data. In an embodiment, the encrypted communication channel can be a wired encrypted communication channel. In another embodiment, the encrypted communication channel 406 can be a wireless communication channel. For instance, the encrypted communication channel can include one or more wireless encrypted communication channels and/or one or more wired encrypted communication channels, including but not limited to, a wide area network (WAN, e.g., the Internet) encrypted communication channel, a local area network (LAN) encrypted communication channel, a cellular encrypted communication channel, and/or another type of encrypted radio channel. In certain embodiments, the encrypted communication channel can be associated with one or more network devices (e.g., network hardware, network equipment, computer networking devices, etc.) to facilitate communication of the first data via the encrypted communication channel.

At 904, a first machine learning process associated with a generative model for the first data is performed, by the system (e.g., by machine learning component 104), to generate second data indicative of one or more example datasets within a degree of similarity to the first data. In an embodiment, a variational autoencoder associated with the first machine learning process can be employed. For instance, the first data can be provided as input to the variational autoencoder. Furthermore, the variational autoencoder can generate the second data based on the first data. The second data can be medical imaging data, audio data, image data, video data, textual data and/or other data. The second data can also be, for example, machine learning output data. In addition, the second data can be, for example, a compressed version of the first data that includes a lesser degree of identifying data than the data 502. For example, the machine learning output data 506 can include a lower number of features and/or characteristics than the data 502. Furthermore, the first data and the second data can comprise a corresponding data format. In an aspect, the variational autoencoder can employ a probability distribution associated with the first data to generate the second data. Furthermore, the variational autoencoder can be a layered variational autoencoder that employs unsupervised learning associated with a probability distribution for the first data. In another aspect, the variational autoencoder can employ a neural network and stochastic gradient descent associated with the first data. In yet another aspect, the variational autoencoder can include an encoder and a decoder to generate the second data from the first data. In another embodiment, a Hidden Markov Model (HMM), a Bayesian model (e.g., Bayesian network), a probabilistic context-free grammar model, a Naïve Bayes model, a Gaussian mixture model, and/or another type of generative machine learning model associated with the first machine learning process can be employed.

At 906, a second machine learning process associated with a classifier model for the second data is performed, by the system (e.g., by evaluation component 106), to generate third data indicative of a confidence score for the second data. For example, the second machine learning process can employ principles of artificial intelligence to facilitate evaluation of the second data for a particular feature from the one or more features. The confidence score can be indicative of a degree of confidence that the particular feature is included in the first data. The second machine learning process can perform learning with respect to the second data explicitly or implicitly. In an aspect, the second machine learning process can second data for a particular feature from the one or more features based on classifications, correlations, inferences and/or expressions associated with principles of artificial intelligence. For instance, the second machine learning process can employ an automatic classification system and/or an automatic classification process to evaluate the second output data for a particular feature from the one or more features. In an embodiment, the second machine learning process can evaluate the second data based on a deep learning network. The deep learning network can be an artificial neural network that employs deep learning to determine at least one feature associated with the second data. The deep learning network can, for example, employ supervised learning to determine at least one feature associated with the second data. Furthermore, the deep learning network can process information similar to a biological neuron system that employs a cascade of multiple layers of nonlinear processing where a first layer can employ output of a second layer as input for the first layer. In a non-limiting embodiment, the second machine learning process can evaluate the second data based on a convolutional neural network. The convolutional neural network can be a feed-forward artificial neural network that employs deep learning to determine at least one feature associated with the second data. Furthermore, the convolutional neural network can be a classifier associated with supervised learning to determine at least one feature associated with the second data. For instance, the convolutional neural network can include a set of convolutional layers that apply one or more convolutional operations to the second data. The convolutional neural network can also include a set of fully connected layers that compute a classification score associated with the second data. Additionally, in certain embodiments, the convolutional neural network can also include a set of pooling layers that perform downsampling to adjust a spatial dimension associated with the second data. However, it is to be appreciated that in certain embodiments the evaluation component 106 can employ another type of deep learning network.

At 908, it is determined whether the third data satisfies a defined criterion. If no, the computer-implemented method 900 returns to 904 to reperform the first machine learning process based on different criteria. If yes, the computer-implemented method 900 ends. In certain embodiments, the computer-implemented method 900 can further include performing, by the system, the first machine learning process based on fourth data associated with one or more other features in response to a determination that the third data satisfies a defined criterion. The fourth data can be a modified version of the first data. For example, the fourth data can include an increased amount on identifying data for a user identity associated with the first data. In another embodiment, the performing the first machine process and/or the performing the second machine learning process includes improving anonymization of the first data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least performing a first machine learning process and/or performing a second machine learning process a are established from a combination of electrical and mechanical components and circuitry, a human is unable to replicate or perform processing performed by the data anonymization component 102 (e.g., the machine learning component 104, the evaluation component 106, the communication component 202, and/or the negotiation component 302) disclosed herein. For example, a human is unable to perform a first machine learning process and/or a second machine learning process. Furthermore, a human is unable to generate anonymized output data.

Figure 10:
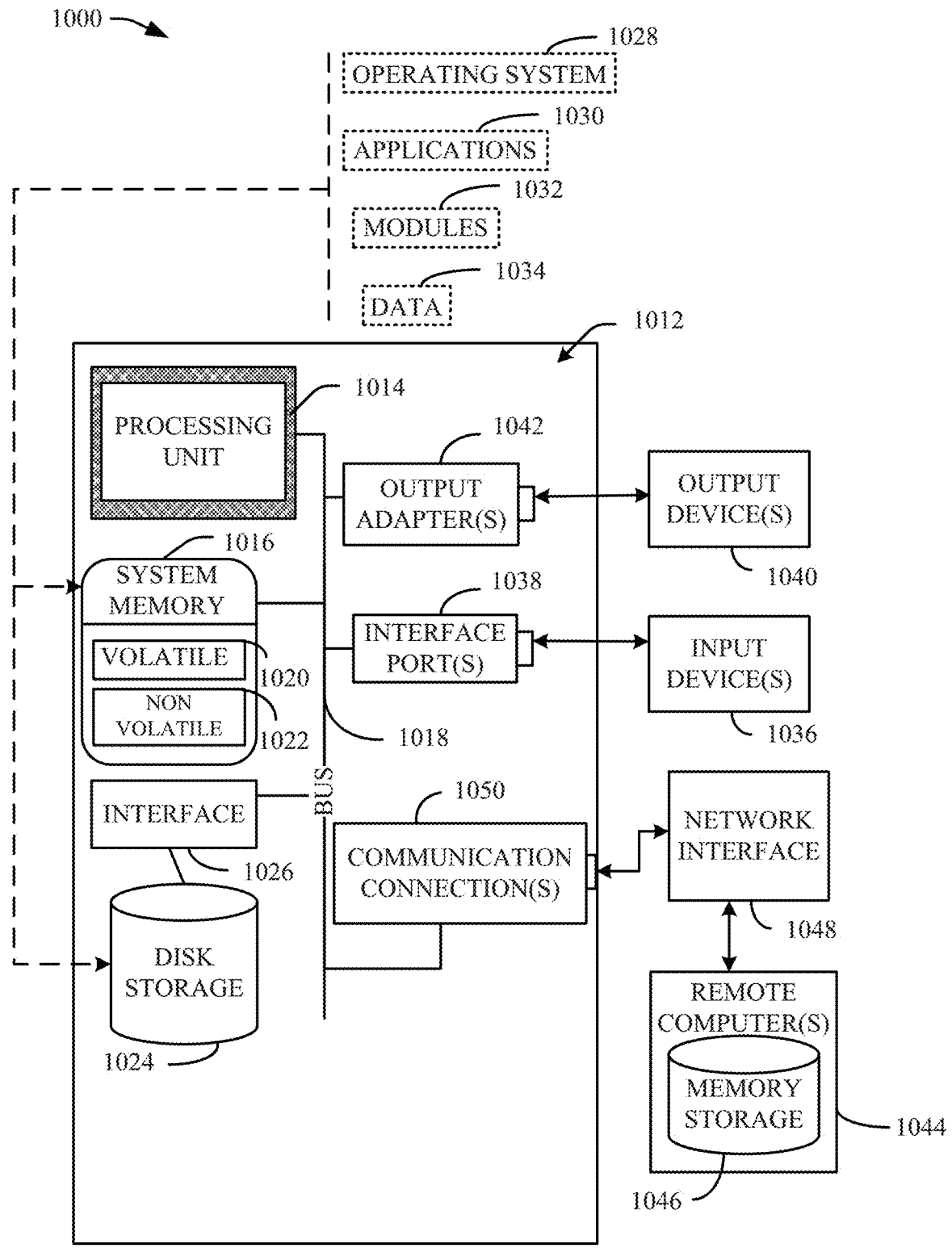
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
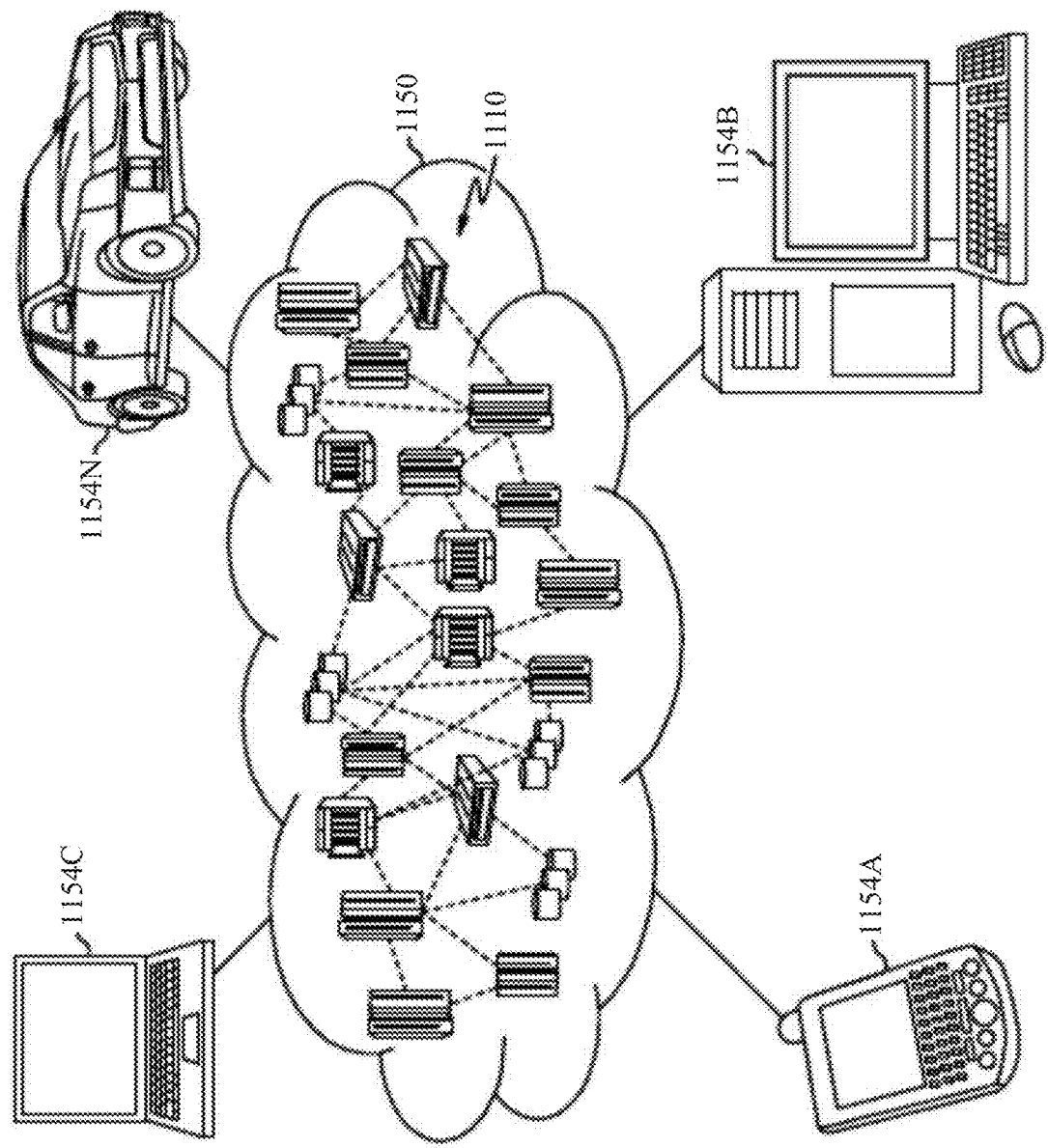
FIG. 11 illustrates a block diagram of an example, non-limiting cloud computing environment in accordance with one or more embodiments of the present invention.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
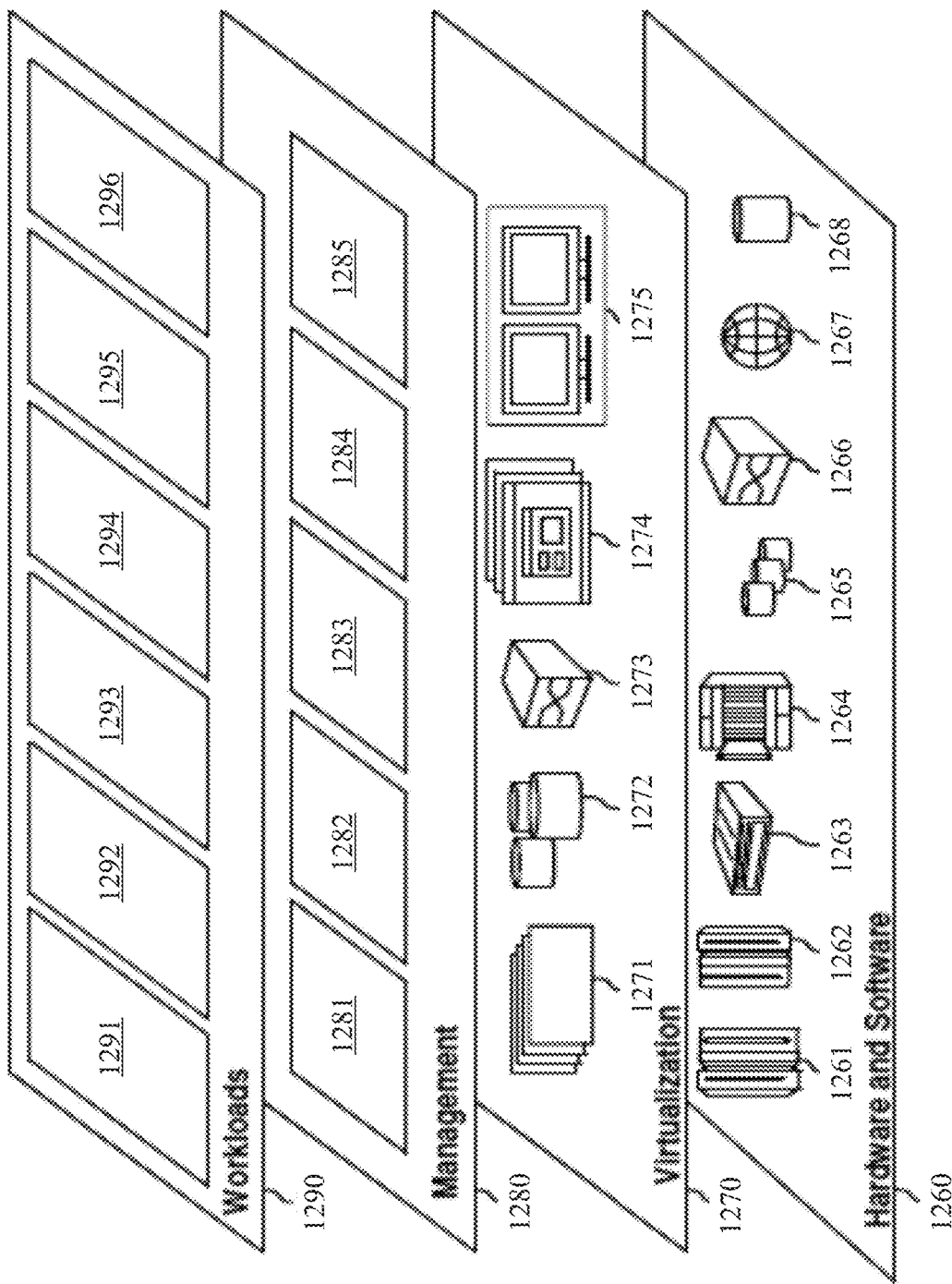
FIG. 12 illustrates a block diagram of example, non-limiting abstraction model layers in accordance with one or more embodiments of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and data anonymization software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer executable components;
  a processor that executes the computer executable components stored in the memory, wherein the computer executable components comprise:
    a machine learning component that performs a machine learning process for first data associated with one or more features to generate second data indicative of one or more example datasets within a degree of similarity to the first data, wherein the first data comprises medical image data from a medical device, and wherein the first data and the second data comprise a corresponding data format; and an evaluation component that evaluates the second data for a particular feature from the one or more features and generates third data indicative of a confidence score for the second data, wherein an amount of identifying data of a user is comprised in the second data to a lesser degree than in the first data to facilitate anonymization of the first data, and wherein the evaluation component employs fourth data associated with the first data for an additional layer of a deep learning network associated with the machine learning process in response to a determination that the third data satisfies a defined criterion.

2. The system of claim 1, wherein the computer executable components further comprise:

a communication component that receives the first data via an encrypted communication channel.

3. The system of claim 1, wherein the machine learning component performs the machine learning process for audio data associated with the first data to generate the second data.

4. The system of claim 1, wherein the machine learning component performs the machine learning process for textual data associated with the first data to generate the second data.

5. The system of claim 1, wherein the machine learning component performs the machine learning process for video data associated with the first data to generate the second data.

6. The system of claim 1, wherein the machine learning component employs a generative model associated with the first data during the machine learning process to generate the second data.

7. The system of claim 1, wherein the machine learning component employs a variational autoencoder associated with the first data during the machine learning process to generate the second data.

8. The system of claim 1, wherein the evaluation component evaluates the second data using a convolutional neural network.

9. The system of claim 1, wherein the evaluation component generates the third data to improve the anonymization of the first data by providing analysis of anonymized data.

10. The system of claim 1, wherein the fourth data is a modified version of the first data, such that the amount of identifying data of the user is comprised in the fourth data to a greater degree than in the first data.

11. A computer-implemented method, comprising:

receiving, by a system operatively coupled to a processor, first data associated with one or more features via an encrypted communication channel, wherein the first data comprises medical image data from a medical device;

performing, by the system, a first machine learning process associated with a generative model for the first data to generate second data indicative of one or more example datasets within a degree of similarity to the first data;

performing, by the system, a second machine learning process associated with a classifier model for the second data to generate third data indicative of a confidence score for the second data, wherein an amount of identifying data of a user is comprised in the second data to a lesser degree than in the first data to facilitate anonymization of the first data; and performing, by the system, the first machine learning process based on fourth data associated with one or more other features in response to a determination that the third data satisfies a defined criterion.

12. The computer-implemented method of claim 11, wherein the receiving comprises receiving audio data associated with the first data.

13. The computer-implemented method of claim 11, wherein the receiving comprises receiving textual data associated with the first data.

14. The computer-implemented method of claim 11, wherein the receiving comprises video data associated with the first data.

15. The computer-implemented method of claim 11, wherein the performing the first machine learning process comprises employing a variational autoencoder associated with the first data to generate the second data.

16. The computer-implemented method of claim 11, wherein the performing the second machine learning process comprises employing a convolutional neural network associated with the second data to generate the third data.

17. The computer-implemented method of claim 11, wherein the fourth data is a modified version of the first data, such that the amount of identifying data of the user is comprised in the fourth data to a greater degree than in the first data.

18. The computer-implemented method of claim 11, wherein the performing the second machine learning process comprises improving the anonymization of the first data by providing analysis of anonymized data.

19. A computer program product for facilitating anonymization of data, the computer program product comprising a non-transitory computer readable medium having program instructions embodied therewith, the program instructions executable by a processor to cause the processor to:

perform, by the processor, a machine learning process for first data associated with one or more features to generate second data indicative of one or more example datasets within a degree of similarity to the first data, wherein the first data comprises medical image data from a medical device; and evaluate, by the processor, the second data for a particular feature from the one or more features;

generate, by the processor, third data indicative of a confidence score for the second data, wherein an amount of identifying data of a user is comprised in the second data to a lesser degree than in the first data to facilitate anonymization of the first data; and perform, by the processor, the machine learning process for fourth data associated with one or more other features in response to a determination that the third data satisfies a defined criterion.

20. The computer program product of claim 19, wherein the fourth data is a modified version of the first data, such that the amount of identifying data of the user is comprised in the fourth data to a greater degree than in the first data.

* * * * *